3,169,130
2,2,3,3-TETRACHLORO-1,4-BUTANEDIOL SULFITE
Max E. Chiddix and Robert W. Wynn, Easton, Pa., assignors to General Aniline & Film Corporation, New York, N.Y., a corporation of Delaware
No Drawing. Filed Jan. 6, 1961, Ser. No. 80,990
1 Claim. (Cl. 260—327)

This invention relates to 2,2,3,3-tetrachloro-1,4-butanediol sulfite, a method for its preparation, and its use as a herbicide.

It is an object of this invention to provide 2,2,3,3-tetrachloro-1,4-butanediol sulfite as a novel composition of matter, a method for its preparation, and a method for employing it as a herbicide.

In accordance with this invention 2,2,3,3-tetrachloro-1,4-butanediol sulfite having the formula

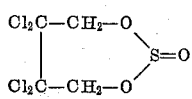

is prepared by heating 2,2,3,3-tetrachloro-1,4-butanediol (prepared by adding chlorine to 2-butynediol-1,4-diacetate and hydrolyzing the diester) with an excess of thionyl chloride until the diol dissolves in the reaction mixture, and separating the resulting sulfurous acid ester from excess thionyl chloride e.g. by adding water to hydrolize the latter. The sulfurous acid ester, which precipitates as a solid from the aqueous medium, can be readily recovered by filtration. If desired, the product can be further purified by recrystallization e.g. from a lower alcohol and/or petroleum ether.

It was found that the product when applied in the form of an aqueous dispersion to soil or seeds possesses valuable herbicidal properties, stunting the growth of seedlings and inhibiting germination of the seeds.

Our invention will be more fully understood from the following examples wherein parts and percentages are by weight, unless otherwises indicated.

Example 1

A mixture of 68.4 parts (0.3 mol) of 2,2,3,3-tetrachloro-1,4-butanediol and 248 parts (2.1 mols) of thionyl chloride was heated on a steam bath to 70° C. for one hour. At the end of this period, the 2,2,3,3-tetrachloro-1,4-butanediol had completely dissolved in the reaction mixture. The solution was drowned in ice-water, whereby excess thionyl chloride was decomposed, and the water-insoluble solid product which remained suspended in the aqueous medium was separated by filtration and washed with cold water. The wet filter cake of 2,2,3,3-tetrachloro-1,4-butanediol sulfite, amounting to 95 parts, was recrystallized from 92 parts of methanol, yielding 51 parts of a white crystalline product. Upon further recrystallization from petroleum ether, the purified product was found to have a melting point of 59–61° C. On analysis it was found to have the following composition:

|   | Percent Found | Theoretical for $C_4Cl_4H_4SO_3$, percent |
|---|---|---|
| C | 17.80 | 17.5 |
| H | 1.61 | 1.5 |
| Cl | 52.45 | 51.8 |
| S | 11.51 | 11.7 |

Example 2

An aqueous 0.1% dispersion was prepared from the product obtained in Example 1 by dissolving 100 mg. thereof in 5 ml. of acetone, adding 5 ml. of a 1% aqueous solution of nonylphenolpolyethyleneglycol ether (a nonionic emulsifying agent) and diluting with 90 ml. water. 25 radish seeds, 25 rye grass seeds and 5 soybeans were planted in each of four 4-inch clay pots. Two of these were each treated 3 to 4 hours after planting with 45 ml. of the .1% aqueous dispersion of 2,2,3,3-tetrachloro-1,4-butanediol sulfite. The other two pots were treated with a corresponding amount of water. All four pots were then placed in a greenhouse. After 5 days, it was observed that the radish and rye grass seedlings in the water-treated pots developed normally, but that those in the pots treated with 2,2,3,3-tetrachloro-1,4-butanediol sulfite were severely stunted. Similarly, when the soybeans in the water-treated pots first developed trifoliate leaves, it was observed that the soybean seedlings in the pots treated with 2,2,3,3-tetrachloro-1,4-butanediol sulfite were also severely stunted.

Example 3

25 radish seeds and 25 rye grass seeds were placed on two filter papers in each of two Petri dishes. 5 ml. of an 0.1% aqueous dispersion of 2,2,3,3-tetrachloro-1,4-butanediol sulfite, prepared as indicated in the preceding example, was added to one dish, and a similar amount of water to the other as a control. The two dishes were covered with aluminum foil and held at room temperature (about 25° C.) for 5 days. Comparison of germination during this period of the seeds in the dish treated with 2,2,3,3-tetrachloro-1,4-butanediol sulfite with germination in the control dish indicated that 2,2,3,3-tetrachloro-1,4-butanediol sulfite exerted a promising anti-germination effect on the seeds. Less than 25% germination had occurred.

In preparing 2,2,3,3-tetrachloro-1,4-butanediol sulfite, thionyl chloride is mixed with 2,2,3,3-tetrachloro-1,4-butanediol in an amount preferably corresponding to at least 2 mols per mol of diol. An inert diluent such as mono- or dichlorobenzene, nitrobenzene or toluene can be included in the reaction mixture e.g. in an amount equal to about 1 to 4 times the weight of the 2,2,3,3-tetrachloro-1,4-butanediol. An excess of thionyl chloride can also be employed as the solvent for the reaction mixture, and this offers the advantage that the reaction is accelerated by the excess reagent and its completion is favored. A quantity of thionyl chloride amounting to 2 to 5 times the weight of the diol is suitable for use in this manner.

The reaction mixture is heated preferably at a temperature of 50 to 75° C. until the reaction is substantially complete—ordinarily for 1–2 hours, or until the diol has dissolved in the mixture.

Excess thionyl chloride can be readily removed by hydrolysis, leaving the water-insoluble product as a precipitate in aqueous medium. Alternatively, the inert organic solvent and excess thionyl chloride can be removed by distillation, and the product recovered from the residue. Purification can be carried out by recrystallization from a lower alcohol such as methanol or ethanol, and/or petroleum ether.

In employing 2,2,3,3-tetrachloro-1,4-butanediol sulfite as a herbicide in accordance with this invention, an aqueous dispersion of the sulfite ester is advantageously prepared by dissolving the compound in a small amount of water-miscible solvent such as acetone, and adding the resulting solution to a solution in water of an emulsifying agent e.g. an aqueous 0.02–0.1% solution of a nonionic emulsifying agent such as nonylphenol polyethyleneglycol or an anionic emulsifying agent such as lauryl sodium sulfate. The concentration of 2,2,3,3-tetrachloro-1,4-butanediol sulfite in the dispersion may range appropriately from 0.01% to 0.2%. The dispersion is then applied to soil containing seeds or seedlings of which it is desired to inhibit germination or development. The application may be suitably made at such rate as to provide 2 to 10 grams of the sulfite ester per square yard.

Variations and modifications which will be obvious to those skilled in the art can be made in the procedures described above without departing from the scope or spirit of the invention.

We claim:

2,2,3,3-tetrachloro-1,4-butanediol sulfite having the following formula

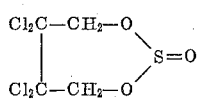

References Cited in the file of this patent

UNITED STATES PATENTS

| | | |
|---|---|---|
| 2,471,274 | Lingo | May 24, 1949 |
| 2,719,783 | Kohn | Oct. 4, 1955 |
| 2,833,785 | Dietrich et al. | May 6, 1958 |
| 2,845,339 | Bluestone | July 29, 1958 |
| 2,983,732 | Geering et al. | May 9, 1961 |

OTHER REFERENCES

Riemschneider et al.: Z. Naturforsch, 15b, pages 552–4, (1960).

Gillis: J. Org. Chem., volume 25, pages 651–3, (1960).

De Le Mare et al.: Jour. Chemical Soc., 1956, pages 181–317.

Druy: Angew. Chem., volume 72, pages 864–65, (1960).